(12) United States Patent
Zhang

(10) Patent No.: US 9,212,884 B2
(45) Date of Patent: Dec. 15, 2015

(54) MEASURING DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Bing-Jun Zhang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 191 days.

(21) Appl. No.: 14/093,639

(22) Filed: Dec. 2, 2013

(65) Prior Publication Data

US 2014/0310971 A1 Oct. 23, 2014

(30) Foreign Application Priority Data

Apr. 22, 2013 (CN) .......................... 2013 1 0139898

(51) Int. Cl.
*G01G 5/06* (2006.01)
*G01B 3/38* (2006.01)
*G01B 3/20* (2006.01)

(52) U.S. Cl.
CPC . *G01B 3/38* (2013.01); *G01B 3/205* (2013.01)

(58) Field of Classification Search
CPC .............. G01B 5/08; G01B 3/40; G01B 3/00; G01B 3/04; G01B 3/30; G01B 3/32; G01B 5/00; G01B 5/0025; G01B 5/02; G01B 5/061; G01B 5/24; G01B 5/241; G01B 7/24

USPC ............................ 33/784, 792, 797, 811–819
See application file for complete search history.

(56) References Cited

U.S. PATENT DOCUMENTS

| 2,825,972 | A | * | 3/1958 | Burchell | 33/792 |
| 3,222,788 | A | * | 12/1965 | Neslund | 33/797 |
| 4,642,901 | A | * | 2/1987 | Webb | 33/530 |
| 4,796,363 | A | * | 1/1989 | Rutter et al. | 33/815 |
| 6,408,532 | B1 | * | 6/2002 | Keys et al. | 33/833 |
| 2013/0067760 | A1 | * | 3/2013 | Husted | 33/784 |
| 2014/0310971 | A1 | * | 10/2014 | Zhang | 33/811 |

* cited by examiner

*Primary Examiner* — Yaritza Guadalupe-McCall
(74) *Attorney, Agent, or Firm* — Novak Druce Connolly Bove + Quigg LLP

(57) ABSTRACT

A measuring device is configured for measuring a thickness of a wall, the measuring device includes a bracket, a guide assembly, a benchmark member, and a gauge. The bracket includes a base body, a first installation portion, and a second installation portion, and the first installation portion and the second installation portion extending from opposite ends of the base body. The guide assembly is movably received through the first installation portion. The benchmark member is mounted on the second installation portion. The gauge mounted on the guide assembly. The gauge is configured to be rotated by the guide assembly and indicates a measurement when the benchmark member contacts a first surface of the wall, the gauge contacts a second surface of the wall, and a central line of the gauge is coaxial with the benchmark line of the benchmark member.

18 Claims, 5 Drawing Sheets

MEASURING DEVICE

BACKGROUND

1. Technical Field

The present disclosure generally relates to measuring devices, and particularly to a measuring device for measuring a thickness of a bottom wall of a slot defined in a workpiece.

2. Description of the Related Art

Slots are often defined in workpieces for assembling with or engaging with other structures. A caliper is usually used to measure a thickness of a bottom wall of a slot to determine whether the bottom wall of the slot has a desired thickness. The thickness of the bottom wall is determined by measuring a height of the workpiece, measuring a depth of the slot, and calculating a difference between the height and the depth. However, it is time-consuming and inconvenient to measure the thickness manually. In addition, the measured wall thickness may vary greatly because the contacting point of the caliper to the bottom wall may vary in each measurement.

Therefore, there is room for improvement within the art.

BRIEF DESCRIPTION OF THE DRAWING

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
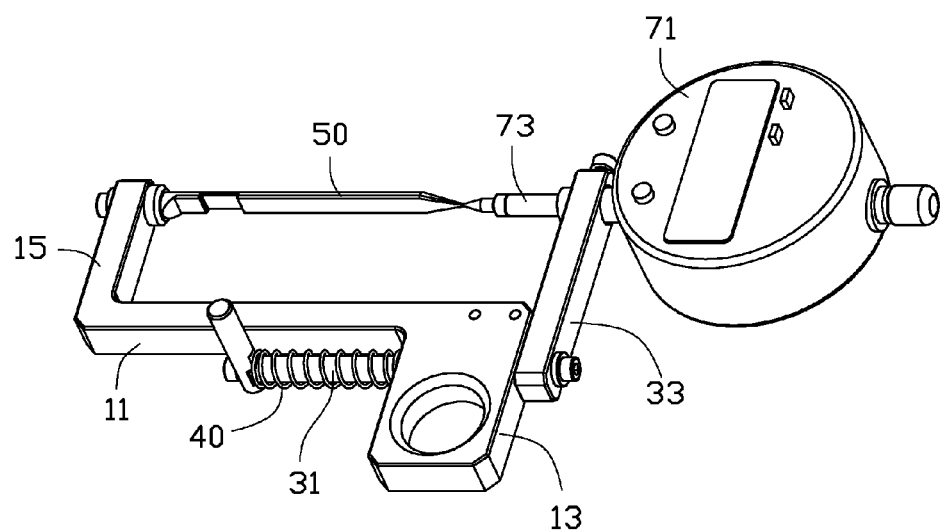
FIG. 1 shows an assembled, isometric view of an embodiment of a measuring device.
Figure 2:
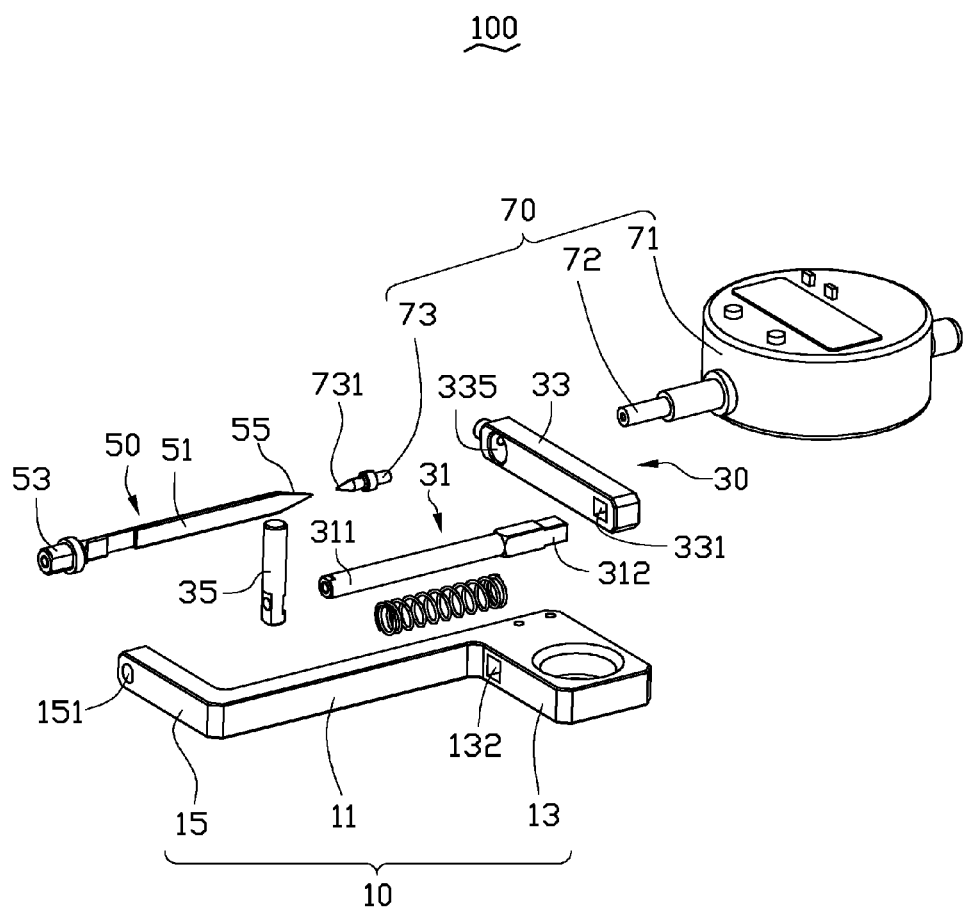
FIG. 2 shows an exploded view of the measuring device of FIG. 1.
Figure 3:
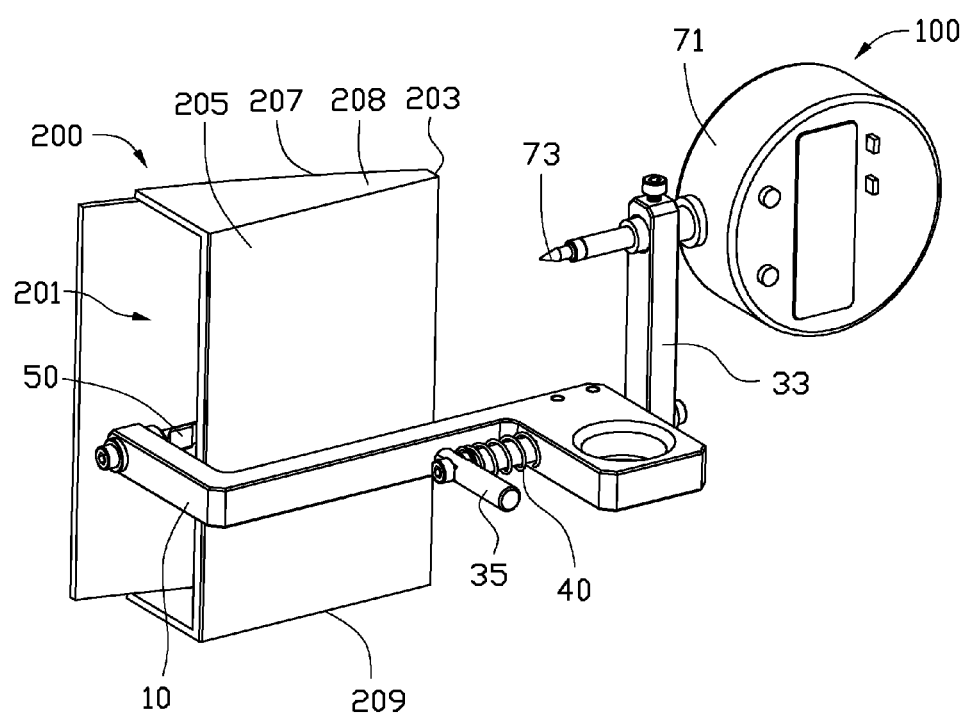
FIG. 3 shows one working state of the measuring device of FIG. 1.
Figure 5:
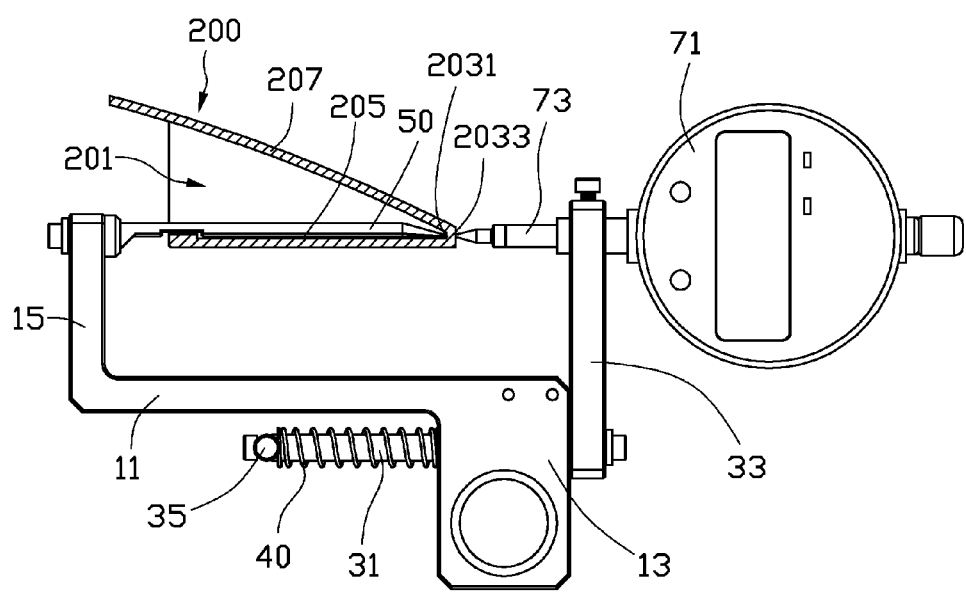
FIG. 5 is a cross-sectional view of the measuring device of FIG. 4 taken along line V-V.

FIGS. 1 through 3 show a measuring device 100 for measuring a thickness of a bottom wall 203 of a recess slot 201 defined in a workpiece 200. The recess slot 201 is substantially V-shaped. The recess slot 201 includes the bottom wall 203, a first sidewall 205, a second sidewall 207, a third sidewall 208, and a fourth sidewall 209. The first sidewall 205, the second sidewall 207, the third sidewall 208, and the fourth sidewall 209 extend from edges of the bottom wall 203. The first sidewall 205 is connected substantially perpendicularly to the bottom wall 201, and the first sidewall 205 and the second sidewall 207 are opposite to each other. The second sidewall 207 is connected accurately to the bottom wall 203. Referring to FIG. 5, the bottom wall 203 includes a first surface 2031 and a second surface 2033 opposite to the first surface 2031. The first surface 2031 is a bottom surface of the slot 201. A thickness of the bottom wall 203 is a distance between the first surface 2031 and the second surface 2033.

The measuring device 100 includes a bracket 10, a guide assembly 30, an elastic member 40, a benchmark member 50, and a gauge 70.

The bracket 10 is substantially Z-shaped and includes a base body 11, a first installation portion 13, and a second installation portion 15. The first and second installation portions 13, 15 extend substantially perpendicularly from two ends of the base body 11, respectively. The first installation portion 13 and the second installation portion 15 extend in opposite directions. A non-rotary hole 132 is defined through the first installation portion 13. A fixing hole 151 is defined in the second installation portion 15. In one embodiment, the non-rotary hole 132 is substantially square. In other embodiments, the non-rotary hole 132 can be other non-rotary shapes.

The guide assembly 30 includes a guiding member 31, a fixing member 33, and a handle 35. The guiding member 31 includes a guiding post 311 and a non-rotary arm 312 protruding from an end of the guiding post 311 along an axis of the guiding post 311. The guiding post 311 is substantially columnar and movably received through the non-rotary hole 132. The non-rotary arm 312 is securely received in the non-rotary hole 132. A mounting hole 331 is defined in one end of the fixing member 33, and an installing hole 335 is defined in another end of the fixing member 33 opposite to the mounting hole 331. The fixing member 33 is fixedly connected to an end of the non-rotary arm 312 away from the guiding post 311 via the mounting hole 331 and resists against a side surface of the first installation portion 13 away from the base body 11. The handle 35 is fixedly connected substantially perpendicularly to the guiding post 311 away from the non-rotary arm 312 for conveniently rotating the guiding member 31.

The elastic member 40 is sleeved around the guiding post 311.

The benchmark member 50 includes a benchmark body 51, an adjustable screw 53, and a pointed detecting head 55. The adjustable screw 53 and the pointed detecting head 55 are at opposite ends of the benchmark body 51, respectively. The adjustable screw 53 is received in the fixing hole 151 for assembling the benchmark member 50 to the second installation portion 15. The pointed detecting head 55 is for precisely contacting a small area of the bottom wall 203. The benchmark member 50 is substantially parallel to the base body 11. An axis of the benchmark member 50 is defined as a benchmark line. The gauge 70 includes a gauge body 71, a connecting arm 72, and a measuring portion 73. The connecting arm 72 is connected between the gauge body 71 and the measuring portion 73. The gauge body 71 displays size measurements of the bottom wall 203. The connecting arm 72 is received through the installing hole 335 for connecting the gauge 70 to the fixing member 33. The measuring portion 73 has a pointed measuring head 731 at an end thereof away from the gauge body 71. The pointed measuring head 731 of the measuring portion 73 extends toward the pointed detecting head 55 of the benchmark member 50. In use, the pointed measuring head 731 of the measuring portion 73 contacts the second surface 2033, and the pointed detecting head 55 of the benchmark member 50 contacts the first surface 2031. When an axis of the measuring portion 73 is coaxial with the benchmark line of the benchmark member 50, a thickness of the bottom wall 203 can be obtained and displayed by the gauge body 71.

In assembly, the non-rotary arm 312 is movably received through the non-rotary hole 132 and fixedly received in the mounting hole 331, and the elastic member 40 is sleeved around the guiding post 311. The handle 35 is connected to an end of the guiding post 311 away from the non-rotary arm 312. Thus, the elastic member 40 is between the handle 35 and the first installation portion 13. The adjustable screw 53 is received in the fixing hole 151 to mount the benchmark member 50 to the second installation portion 15. The connecting arm 72 is received through the installing hole 335 for assembling the gauge 70 to the fixing member 33. The measuring portion 73 is connected to the connecting arm 72 and extends toward the benchmark member 50, such that the measuring portion 73 is coaxial with the benchmark line of the benchmark member 50.

Figure 4:
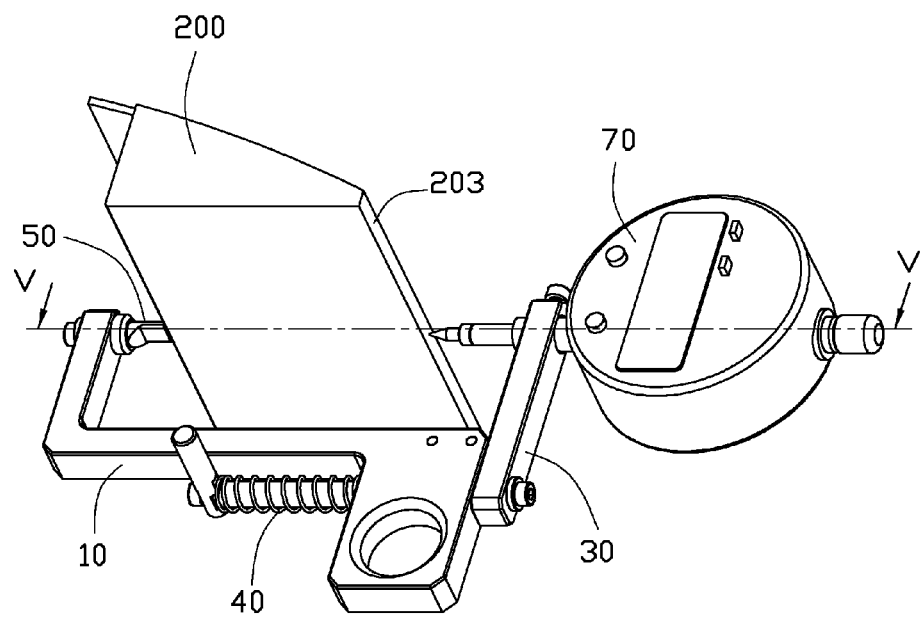
FIG. 4 shows another working state of the measuring device of FIG. 1.

Also referring to FIGS. 3-5, in use, the non-rotary arm 312 is detached from the non-rotary hole 132, such that the elastic member 40 is compressed. The handle 35 is rotated to rotate the guiding member 31, thereby rotating the measuring portion 73 away from the benchmark line of the benchmark member 50. The benchmark member 50 is received in the slot 201, and the pointed detecting head 55 contacts the first surface 2031. The handle 35 is rotated to rotate the measuring portion 73 back to be coaxial with the benchmark line of the benchmark member 50. The guiding member 31 is released, and the elastic member 40 restores to clamp part of the non-rotary arm 312 in the non-rotary hole 132, thereby causing the pointed measuring head 731 of the measuring portion 73 to resist against the second surface 2033. The measuring plate 71 displays the measured thickness data.

As described above, the benchmark member 50 is connected to the bracket 10, the measuring member 70 is mounted on the fixing member 33. The gauge 70 is configured to be rotated by the guide assembly 30, the gauge 70 indicates a measurement when the benchmark member 50 contacts the first surface 2031 of the bottom wall 203, the gauge 70 contacts the second surface 2033, and a central line of the gauge 70 is coaxial with the benchmark line. The thickness is obtained via just one measurement. Therefore, operation of the measuring device 100 is easy. In addition, measuring tolerance of the measuring device 100 is improved since the benchmark member 50 contacts the first surface 2031 at the same time as the measuring portion 73 contacting the second surface 2033.

In other embodiments, the handle 35 can be omitted, such that an end of the elastic member 40 away from the first installation portion 13 is fixed to an external wall of the guiding post 311. The elastic member 40 can be omitted, such that an operator directly operates the guiding member 31.

In other embodiments, the first installation portion 13 and the second installation 15 can extend from opposite ends of the base body 11 along a same direction. The first installation portion 13 and the second installation portion 15 also can be not parallel to each other, as long as the central line of the measuring portion 73 is coaxial with the benchmark line of the benchmark member 50 in use.

In other embodiments, the measuring device 100 can be used for measuring sizes of other object, not limited to the bottom wall 203 of the recess slot 201.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A measuring device configured for measuring a thickness of a wall, the measuring device comprising:
   a bracket comprising a base body, a first installation portion, and a second installation portion, and the first installation portion and the second installation portion extending from opposite ends of the base body;
   a guide assembly movably received through the first installation portion;
   a benchmark member mounted on the second installation portion, and an axis of the benchmark member defining a benchmark line; and
   a gauge mounted on the guide assembly, wherein the gauge is configured to be rotated by the guide assembly, the gauge indicates a measurement when the benchmark member contacts a first surface of the wall, the gauge contacts a second surface of the wall opposite to the first surface, and a central line of the gauge is coaxial with the benchmark line.

2. The measuring device of claim 1, wherein the guide assembly comprises a guiding member movably passing through the first installation portion and a fixing member fixedly connected with an end of the guiding member away from the base body, the gauge is fixed on the fixing member, and the guiding member is rotatatable relative to the first installation portion.

3. The measuring device of claim 2, wherein the guiding member comprises a guiding post and a non-rotary arm protruding from an end of the guiding post along an axis of the guiding post, a non-rotary hole is defined in the second installation portion, the guiding post is movably received through the non-rotary hole, the non-rotary arm is securely received in the non-rotary hole, and the fixing member is fixedly connected to the end of the non-rotary arm away from the guiding post.

4. The measuring device of claim 3, wherein the measuring device further comprises an elastic member sleeved on the guiding post, and a handle, the handle is connected with the guiding post away from the non-rotary arm, and the elastic member is positioned between the handle and the first installation portion.

5. The measuring device of claim 3, wherein the measuring device further comprises an elastic member sleeved on the guiding post, a first end of the elastic member is fixed on the guiding post adjacent to the first installation, and a second end of the elastic member is fixed on the guiding post away from the first installation.

6. The measuring device of claim 3, wherein the gauge comprises a gauge body, a connecting arm, and a measuring portion, the connecting arm is connected between the gauge body and the measuring portion, the connecting arm is fixed on the fixing member, the gauge indicated the measurement when the benchmark member contacts the first surface, the measuring portion contacts the second surface, and a central line of the measuring portion is coaxial with the benchmark line.

7. The measuring device of claim 1, wherein the benchmark member comprises a benchmark body, an adjustable screw and a pointed detecting head, the adjustable screw and the pointed detecting head are positioned at opposite ends of the benchmark body, and the benchmark member is fixedly connected to the second installation portion via the adjustable screw.

8. A measuring device comprising:
   a bracket comprising a base body, a first installation portion, and a second installation portion, and the first installation portion and the second installation portion extending from opposite ends of the base body;
   a guide assembly movably received through the first installation portion;

a benchmark member mounted on the second installation portion, and an axis of the benchmark member defining a benchmark line; and a gauge mounted on the guide assembly, wherein the gauge is configured to be rotated by the guide assembly, the gauge indicates a measurement when a central line of the gauge is coaxial with the benchmark line.

9. The measuring device of claim 8, wherein the guide assembly comprises a guiding member movably passing through the first installation portion and a fixing member fixedly connected with an end of the guiding member away from the base body, the gauge is fixed on the fixing member, and the guiding member is rotatable relative to the first installation portion.

10. The measuring device of claim 9, wherein the guiding member comprises a guiding post and a non-rotary arm protruding from an end of the guiding post along an axis of the guiding post, a non-rotary hole is defined in the second installation portion, the guiding post is movably received through the non-rotary hole, the non-rotary arm is securely received in the non-rotary hole, and the fixing member is fixedly connected to the end of the non-rotary arm away from the guiding post.

11. The measuring device of claim 10, wherein the measuring device further comprises an elastic member sleeved on the guiding post, a first end of the elastic member is fixed on the guiding post adjacent to the first installation, and a second end of the elastic member is fixed on the guiding post away from the first installation.

12. The measuring device of claim 10, wherein the gauge comprises a gauge body, a connecting arm, and a measuring portion, the connecting arm is connected between the gauge body and the measuring portion, the connecting arm is fixed on the fixing member, and the gauge indicates the measurement when a central line of the measuring portion is coaxial with the benchmark line.

13. A measuring device comprising:
a bracket comprising a base body, a first installation portion, and a second installation portion, and the first installation portion and the second installation portion extending from opposite ends of the base body;
a guide assembly movably received through the first installation portion;
a benchmark member mounted on the second installation portion, and an axis of the benchmark member defining a benchmark line;
a handle connected to the guide assembly away from the first installation portion, and
a gauge mounted on the guide assembly, wherein the gauge is configured to be rotated by the guide assembly, the gauge indicates a measurement when a central line of the gauge is coaxial with the benchmark line.

14. The measuring device of claim 13, wherein the guide assembly comprises a guiding member movably passing through the first installation portion and a fixing member fixedly connected with an end of the guiding member away from the base body, the gauge is fixed on the fixing member, the guiding member is rotatatable relative to the first installation portion, and the handle is connected with the guiding post away from the first installation portion.

15. The measuring device of claim 14, wherein the guiding member comprises a guiding post and a non-rotary arm protruding from an end of the guiding post along an axis of the guiding post, a non-rotary hole is defined in the second installation portion, the guiding post is movably received through the non-rotary hole, the non-rotary arm is securely received in the non-rotary hole, the fixing member is fixedly connected to the end of the non-rotary arm away from the guiding post, and the handle is connected with the guiding post away from the non-rotary arm.

16. The measuring device of claim 15, wherein the measuring device further comprises an elastic member sleeved on the guiding post, and the elastic member is positioned between the handle and the first installation portion.

17. The measuring device of claim 15, wherein the measuring device further comprises an elastic member sleeved on the guiding post, a first end of the elastic member is fixed on the guiding post adjacent to the first installation, and a second end of the elastic member is fixed on the guiding post away from the first installation.

18. The measuring device of claim 13, wherein the benchmark member comprises a benchmark body, an adjustable screw and a pointed detecting head, the adjustable screw and the pointed detecting head are positioned at opposite ends of the benchmark body, and the benchmark member is fixedly connected to the second installation portion via the adjustable screw.

* * * * *